UNITED STATES PATENT OFFICE.

LUCINDA MARMADUKE, OF SHELBYVILLE, MISSOURI.

IMPROVED MEDICAL COMPOUND.

Specification forming part of Letters Patent No. 56,072, dated July 3, 1866.

*To all whom it may concern:*

Be it known that I, LUCINDA MARMADUKE, of the town of Shelbyville, in the county of Shelby and State of Missouri, have invented a new and useful Vegetable Compound—"Marmaduke's Becheu, a Vegetable Compound"—as an almost infallible remedy for deep-seated colds, the harbinger of consumption, croups, and diseases of a kindred character; and I do hereby declare that the following is a full and exact description thereof, reference being had to the accompanying specimens.

The nature of my invention consists in so equalizing said ingredients and forming said compound as to produce a sure remedy for those diseases mentioned and those of a kindred character.

To enable others skilled in the art to make and use my invention, I will proceed to describe the process.

Take equal parts ground ivy, cohosh, hoarhound, polypody, valerian, Iceland moss, licorice-root, spikenard, balm-of-gilead, elecampane, Indian turnip, liverwort, comfrey, striped elder, wafer-ash, and one-half the quantity of blood-root. Place all in some suitable vessel; add water and boil until the full strength of said herbs or vegetables is obtained; then strain carefully and add one pound of good sugar to each gallon of the liquid; again boil until the sugar is thoroughly dissolved. When the compound is cold add one-third of a pint of the tincture of lobelia to each gallon of said liquid. Add then a quantity of good liquor, sufficient to preserve said compound.

What I claim as my invention, and desire to secure by Letters Patent, is—

The compounding of said herbs or vegetables, as above described.

LUCINDA MARMADUKE.

Witnesses:
JOHN DICKERSON,
T. BUTTERWORTH.